A. A. WAKEFIELD.
CABLE BOX.
APPLICATION FILED MAY 14, 1910.
1,223,750.
Patented Apr. 24, 1917.
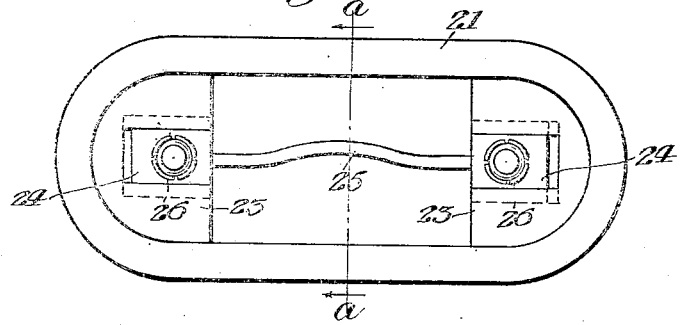
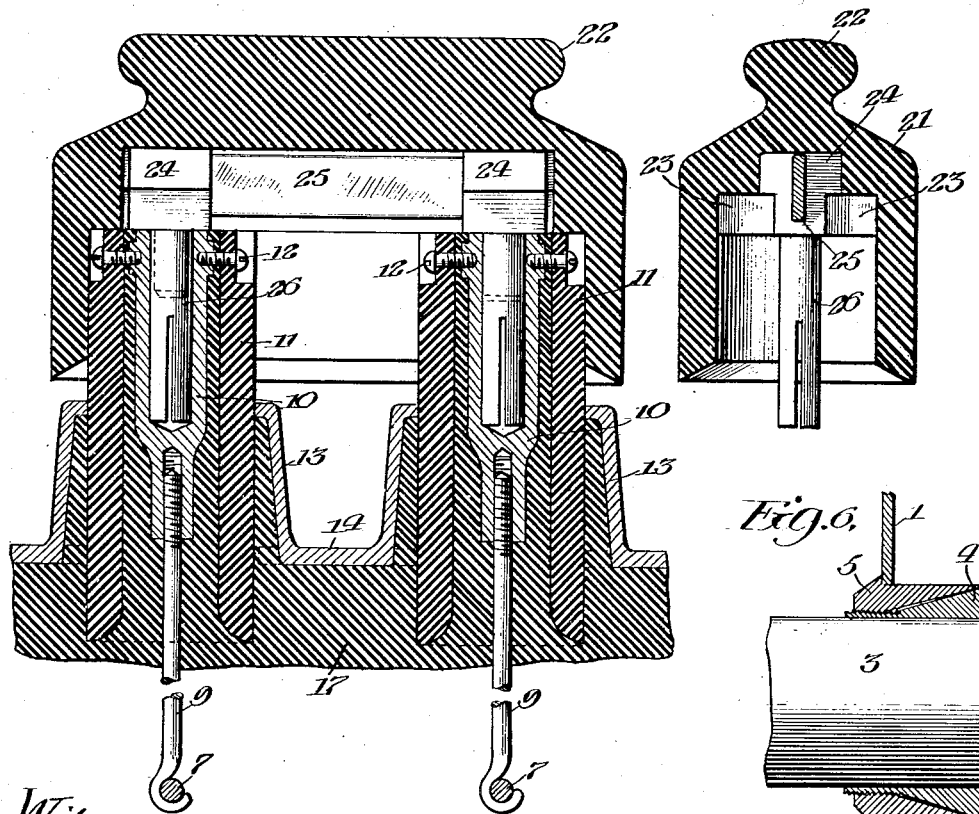

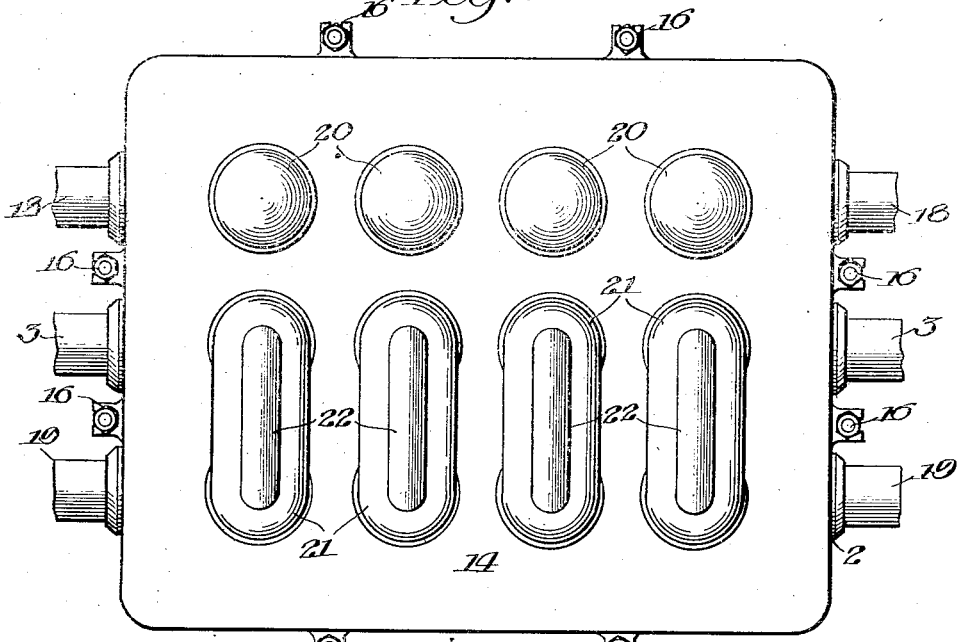
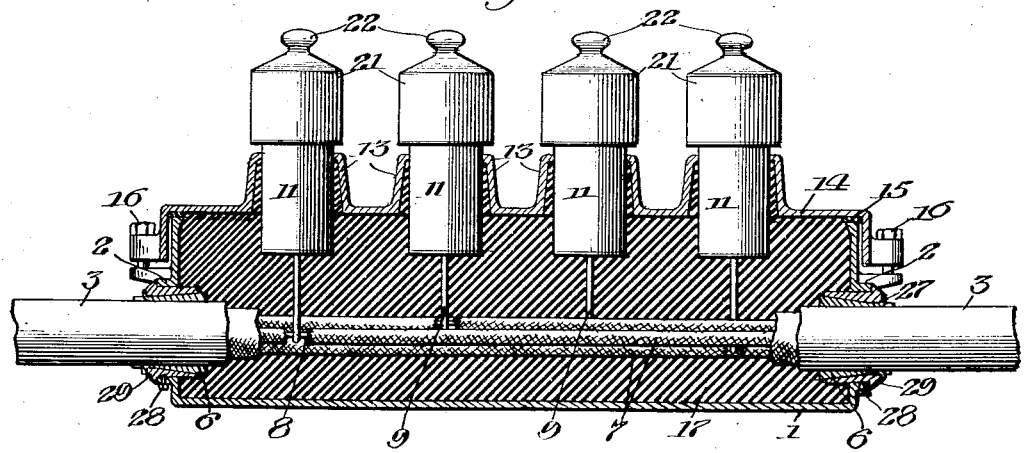

UNITED STATES PATENT OFFICE.

ALBERT A. WAKEFIELD, OF CHICAGO, ILLINOIS, ASSIGNOR, BY MESNE ASSIGNMENTS, TO G & W ELECTRIC SPECIALTY CO., OF CHICAGO, ILLINOIS, A CORPORATION OF ILLINOIS.

CABLE-BOX.

1,223,750.   Specification of Letters Patent.   Patented Apr. 24, 1917.

Application filed May 14, 1910. Serial No. 561,360.

*To all whom it may concern:*

Be it known that I, ALBERT A. WAKEFIELD, a citizen of the United States, residing at Chicago, in the county of Cook and State of Illinois, have invented a certain new and useful Improvement in Cable-Boxes, of which the following is a full, clear, concise, and exact description, reference being had to the accompanying drawings, forming a part of this specification.

My invention relates to cable boxes and is designed more particularly for use in connection with cables and subsidiary circuits where my invention serves the purpose of providing interconnecting features. My invention has a variety of uses in this connection, being applicable for interconnecting purposes between mains and feeders and being of special utility as emergency changes may be made with circuits which can be opened or broken, or otherwise changed at will.

The device itself is for use in high potential systems and is applicable in such systems, being primarily of advantage when moisture-proof construction is at least desirable, if not absolutely necessary. In the preferred embodiment of the invention, I provide what I might call a cable box of such character that one or more cables, each having one or more conductors, enter said cable box within which some, or all, of the cables are opened and their individual conductors brought to connecting appliances. The cable box is then filled with insulating compound, or other means may be utilized, thereby to inclose the open parts within the cable box both for insulating and waterproofing purposes.

The connecting appliances mentioned might be called terminals and my invention provides means whereby these terminals may be interconnected by means suitable for high potential work or moisture-proof work.

I will explain my invention more in detail by reference to the accompanying drawings illustrating a preferred form of carrying out the invention, in which:

Figure 1 is a plan view of my improved cable box;

Fig. 2 is a sectional view along the line of one of the entering cables;

Fig. 3 is a fragmentary sectional view at right angles to the sectional view of Fig. 2.

Fig. 4 is a bottom view of one of the interconnecting hoods;

Fig. 5 is a sectional view on line $a, a$ of Fig. 4; and

Fig. 6 is a detail of construction involving waterproof connection of the cable sheath.

In describing this invention, I am describing it specifically as to the various parts utilized in the particular form shown, but I do not mean to imply thereby that such construction need be adhered to as the invention is liable for use under greatly varied conditions and in different forms.

I provide a pan shaped receptacle 1 having a plurality of outlets 2, which outlets are for the purpose of receiving entering cables 3, 3. The cables are usually provided with a lead sheath, as more clearly illustrated in Fig. 6. Next to the cable sheath a conical split sleeve 4 is fitted which has screw threads at its smaller extremity which are adapted for engagement by a nut 5 having a projection to fit against the receptacle 1. This nut when it is screwed tightly into engagement with the split sleeve 4 draws the same tightly against the cable sheath throughout the entire periphery and thereby hermetically seals the cable to the receptacle.

The construction shown in Fig. 2 however may be employed in which a sleeve 6 may be used of conical shape co-acting with a conical member 29, which parts are driven tightly together and whereafter a portion of the conical member 6 is bent over at 27 to hold the two parts together. A set screw 28 may further be utilized to hold the parts in place.

The cable is made up of a number of conductors, in this case four, as the cable is designed for use in a three phase, four wire system. My invention is herein shown as applied to such a system.

Referring more particularly to Fig. 2, the cable is made up of the conductors 7, 7 and each one of the conductors has a portion of the insulation broken away, as at 8. The uninsulated portion is thus in condition to be metallically connected, referring to Fig. 3, by means of a link having a hooked extremity 9. These links may be of different lengths to accommodate the conductors in their different positions, or may be further adjusted through the agency of the screw threaded connection, which they have at their upper extremities with a socket terminal 10.

The socket terminal 10 is held in a preferably porcelain tube 11 by means of two screws 12, 12. The porcelain tubes 11 and their associated mechanisms might be called insulating outlets and these porcelain tubes are mounted within raised outlet portions 13 provided in a cover 14. These outlets are arranged both lengthwise and crosswise of the cables within the casing, and are spaced apart equally from each other. The cover, through the interposition of a gasket 15 and nuts 16 is adapted to hermetically seal the receptacle 1.

It will thus be seen that the various conductors entering the cable box can be provided with terminals which are accessible. Insulating compound is poured in around all of the parts and fills the entire interior up to the top of the insulating outlets, thus to make all parts waterproof and to properly insulate them. Assuming now that two of the cables 18 and 19, as shown in Fig. 1, represent the feeders, cables 3, 3 may represent a main or mains to be connected to either feeder at will. It will be seen that the individual conductors of all of the cables 3, 18 and 19 are brought up to terminals 10 and can be interconnected as desired, that is, the main 3 having its four three phase conductors can be connected to either three phase feeders 18 or 19.

If no interconnections are made, hoods 20, similar in form to the interconnecting hoods to be later described, or any other suitable protecting structure, are mounted upon the tubes 11 and thus prevent access to the terminals 10 and protect them against moisture attack.

For interconnecting purposes, I provide a hood having two or more connecting plugs depending upon how many circuits are to be interconnected with each other and these hoods 21 are then put in place, as shown more clearly in Figs. 1 and 3. The hoods 21 have a rail 22 whereby they can readily be grasped by the hand and are hollow having recess portions, as more clearly shown in Figs. 3 and 5, being provided with however, projecting flanges 23, 23 at the extremities thereof so that they may hold in place metallic lugs 24, which are pushed into the recesses and which metallic lugs are united by a flexible conducting member 25.

It will be readily apparent that the hoods 21 thus have the metallic lugs 24 firmly held in place and these metallic lugs connect together by the conducting strip 25, which lugs 24 have preferably a bifurcated plug 26, which plug is adapted for insertion within the terminals 10 for interconnecting purposes. The hoods as will be seen are provided with overhanging portions to prevent access of moisture to the metallic portions to be protected thereby.

I have thus provided a safe means whereby high potential circuits may be provided with terminals in such a way that circuit interconnections can be safely made without the necessity of making absolutely permanent interconnections between circuits when such permanent connections, as a usual thing, do not remain in their initially interconnected conditions except for relatively short periods of time.

While I have herein shown and particularly described one of the preferred embodiments of my invention, I do not limit myself to the precise construction and arrangement as herein set forth, but having thus described my invention, what I claim as new and desire to secure by Letters Patent is:

1. A device of the class specified comprising a box or casing, a plurality of parallel cables each being composed of a plurality of strands which enter and leave the casing, said casing being apertured to permit the introduction of conductors which connect with the several strands of each of the cables, said apertures extending in lines which are perpendicular to each other, means for connecting conductors which extend in a line over the cable, said means forming a means for connecting a conductor of one line with the conductor which extends in a line which is perpendicular to the first mentioned line.

2. A cable box having suitable apertures to permit the inlet and outlet of the cable, and also having members by which connection can be made with the cable, said members being inclosed in insulating bushings and provided with means for adjustment of the member toward and away from the cable, and also with means for temporarily securing said members in adjusted position.

3. A cable box having suitable apertures to permit the inlet and outlet of the cable, and also having members by which connection can be made with the cable, said members being inclosed in insulating bushings and provided with means for adjustment of the members toward and away from the cable, and also with means for temporarily securing said members in adjusted position, said means comprising screws extending transversely through the upper ends of the insulating bushings and engaging the members.

4. A cable box having a plurality of conductors entering therein, individual insulated conducting members for said conductors, having their respective ends provided with a hook and a socket, said hooked ends connecting a member with its allotted conductor, and means for electrically interconnecting said socketed conductor outlets.

5. A cable box having a plurality of conductors entering therein, individual insulated conducting members for said conductors, said conductors having their opposite ends provided with a hooked portion and a rotatable socketed portion, said hooked portion connecting said member with its allotted conductor, and insulating hoods having members which enter the socketed portion of said members for electrically interconnecting said conducting members.

6. A device of the class specified, comprising a casing having two of its side walls each provided with a plurality of cable apertures, in combination with a plurality of cables entering through the apertures of one of said side walls and leaving through apertures in the other of said side walls, said cables being stripped of their insulation within said casing to permit access to the several strands thereof, said casing having its top provided with a series of outlets, each of which is provided with a contact member connected with a strand of one of said cables, each outlet forming a socket for selectively receiving a member which is constructed to connect the strands of the several cables.

7. A device of the class specified, comprising a box or casing, a plurality of parallel cables each having a plurality of strands, conductors connected with the several strands of each cable, the conductors being positioned lengthwise and crosswise of said cables, and means for connecting the strands of the same cable when the said means is placed in line with said cable, and said means forming a means for connecting the strands of adjacent cables when placed transverse to the last mentioned cable.

8. A device of the class specified comprising a box or casing, a plurality of parallel cables each having a plurality of strands which enter and leave the casing, said casing being apertured to permit the introduction of conductors which connect with the strands of the cable, the apertures extending in parallel lines along the cables and the apertures of the adjacent cables being positioned opposite the apertures of the intermediate cable, means for connecting the conductors of the same cable, and said means providing a means whereby the strands of adjacent cables may be connected with the strands of the intermediate cable.

9. A device of the class specified comprising a box or casing, a plurality of parallel cables each having a plurality of strands, which enter and leave the casing, said casing being apertured to permit the introduction of conductors which connect with the strands of the cables, the apertures extending in parallel lines along the cables, and being spaced apart at equal distances from each other, and the apertures of the adjacent cables being positioned opposite the apertures of the intermediate cable, and means for connecting the conductors of the same cable or connecting the conductors of the last mentioned cable with the conductors of adjacent cables.

10. A box or casing having opposite vertical side walls provided with a plurality of apertures for a plurality of cables, said apertures being situated equi-distant from one another, and similarly in said walls, said casing having a top or cover provided with outlet apertures arranged in rows extending across said cover between said side walls, said apertures being spaced equally from each other both lengthwise and crosswise.

11. A device of the class specified, comprising a box or casing having two opposite side walls provided with a plurality of apertures for the inlet and outlet of a plurality of cables, the top or cover of said box or casing being provided with a plurality of rows of outlets extending side by side between said side walls, said apertures being spaced equally from each other both lengthwise and crosswise.

12. A device of the class specified comprising a box or casing, a plurality of cables composed of a plurality of strands entering said casing, said casing being apertured to receive conductors which connect with the strands of said cables, said conductor being longitudinally extensible and having a socket formed in its upper end, a member constructed to connect the conductors of the cables with each other, said member having members which enter the socket in the conductor, and means connecting said last mentioned members.

13. The combination of a cable box comprising a casing and a main cable comprising a plurality of insulated conductors passing through said casing, feeder cables passing through said casing parallel to said main cable, each comprising a plurality of conductors, outlets for the individual conductors of said feeders and main passing through said casing, said outlets being arranged in parallel equidistant rows, the outlets from each cable being in a line parallel with the line of such cable within the box, and devices for connecting the outlets from one cable with those of another.

14. In a cable box in combination, a casing provided with a plurality of apertures, a cable provided with a sheath and a plurality of insulated conductors passing through two of said apertures, said sheath being stripped off within the box, said conductors being bunched together within the box in the same manner as within the sheath and being continuous within the casing, each of said conductors being stripped of insulation at one point within the casing, the stripped points being displaced from each other longitudinally of the conductors, contact pieces connecting with the conductors at the stripped points, and outlet members connected to said contact pieces.

15. A device of the class specified comprising a box or casing, a plurality of cables composed of a plurality of strands entering said casing, said casing being apertured to receive conductors which connect with the strands of said cables, said apertures being spaced from each other at distances which are equal to each other, the conductors being longitudinally extensible and having a socket formed in their upper ends, a member constructed to connect the conductors of the cable, said member having members which enter the sockets of the conductors, and means connecting said members, the member which connects the conductors being constructed to be connected with adjacent conductors of either cable.

In witness whereof, I hereunto subscribe my name this 9th day of May, A. D. 1910.

ALBERT A. WAKEFIELD.

Witnesses:
A. MILLER BELFIELD,
HAZEL JONES.